(No Model.) 2 Sheets—Sheet 1.

J. & T. H. NOXON.
SPRING LOCKING DEVICE FOR DRILL HOES AND CULTIVATOR TEETH.

No. 363,759. Patented May 24, 1887.

Witnesses. Inventors.

(No Model.) 2 Sheets—Sheet 2.

J. & T. H. NOXON.
SPRING LOCKING DEVICE FOR DRILL HOES AND CULTIVATOR TEETH.

No. 363,759. Patented May 24, 1887.

Witnesses.
J. M. Jackson
James E. Mayher

Inventors.
James Noxon
T. H. Noxon
by Donald C. Ridout & Co
Attys

UNITED STATES PATENT OFFICE.

JAMES NOXON AND THOMAS HENRY NOXON, OF INGERSOLL, ONTARIO, CANADA.

SPRING LOCKING DEVICE FOR DRILL-HOES AND CULTIVATOR-TEETH.

SPECIFICATION forming part of Letters Patent No. 363,759, dated May 24, 1887.

Application filed November 23, 1885. Renewed December 23, 1886. Serial No. 222,423. (No model.) Patented in Canada November 18, 1885, No. 22,844.

*To all whom it may concern:*

Be it known that we, JAMES NOXON and THOMAS HENRY NOXON, both of the town of Ingersoll, in the county of Oxford, in the Province of Ontario, Canada, manufacturers of agricultural implements, have jointly invented an Improved Spring Locking Device for Drill-Hoes and Cultivator-Teeth, of which the following is a specification.

The object of the invention is, first, to arrange a single coiled-wire spring on the drag-bar, and to so connect it to the hoe that the draft of the latter shall act simultaneously on both ends of the coiled-wire spring, and, secondly, to arrange the hoe or cultivator-tooth so that the tension of the coiled-wire spring shall constitute the lock for securing the hoe or cultivator-tooth to the drag-bar; and it consists, essentially, first, in a single coiled-wire spring wound round a cylinder, and so connected to the hoe or cultivator-tooth that the draft of the latter shall be directed simultaneously against both ends of the spring, and, secondly, in journaling at the end of the drag-bar a socket-stud, onto which a hook formed on the hoe or cultivator-tooth fits, one end of the coiled spring being connected to the socket-stud, while the other end of the spring is attached to the locking-stud, which is connected to the hoe, as hereinafter explained.

Figure 1:
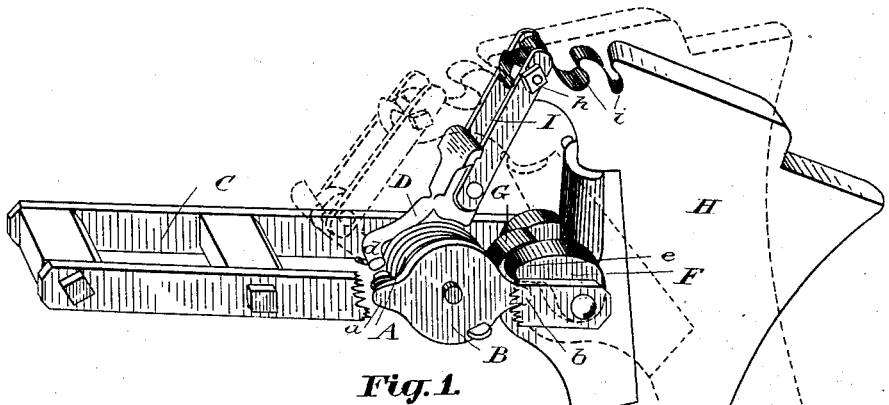
Figure 2:
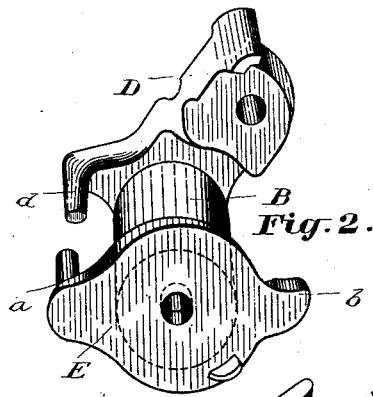
Figures 3, 4:
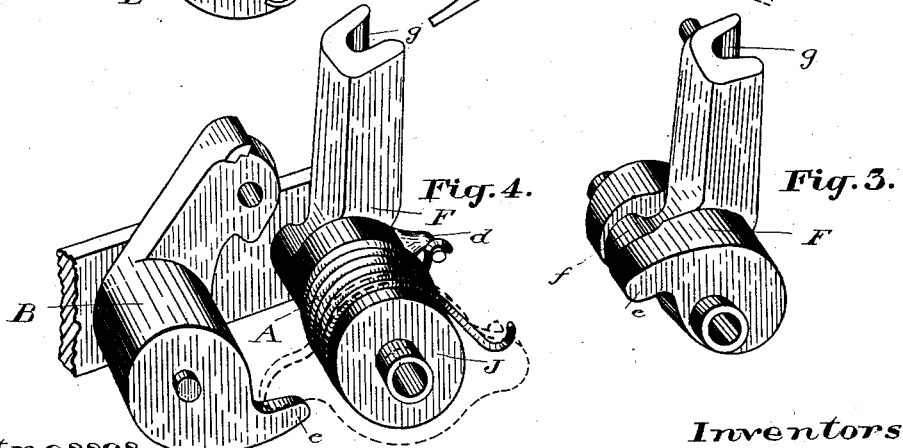
Figure 5:
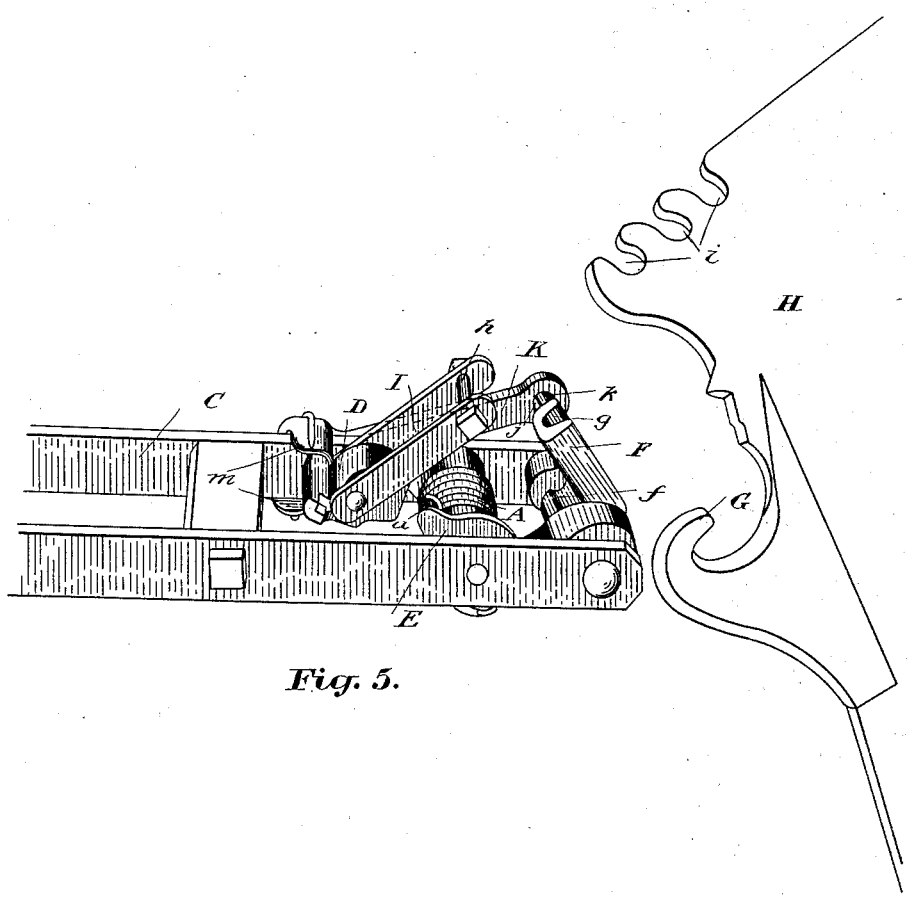

Figure 1 is a perspective view, partially in section, of our improved spring locking device for drill-hoes and cultivator-teeth. Fig. 2 is a perspective detail of the locking-stud and disk. Fig. 3 is a perspective detail of the socket-stud. Fig. 4 is an alternative form, showing the coiled spring wound round a cylinder formed on the socket-stud, instead of a cylinder formed on the locking-stud, as shown in Fig. 1. Fig. 5 is a view showing means for restraining the tension of the spring, so that the hoe or cultivator-tooth may be easily removed.

In the drawings, like letters of reference indicate corresponding parts in each figure; but as there is an alternative arrangement of the coiled spring shown I shall first explain its arrangement when applied as shown in Fig. 1.

A represents the coiled spring, which is wound round a cylinder, B, journaled in the drag-bar C, and attached to or forming part of the locking-stud D.

E is a disk journaled on the cylinder B, and provided with two projections, $a$ and $b$.

One end of the spring A fits against a projection, $d$, formed on the locking-stud D, while the other end of the spring A fits over the projection $a$, formed on the disk E. The other projection, $b$, formed on the disk E fits below a projection, $e$, formed on the socket-stud F, which is journaled on the end of the drag-bar C.

A hook, G, is formed on the hoe or cultivator-tooth H, which is formed so as to clasp the recessed portion $f$ of the stud F when the body of the hoe or cultivator-tooth H is fitted into the socket $g$, formed in the stud F, as represented.

I is a brace, one end of which is pivoted on the stud D, while its other end is provided with a pin or bolt, $h$, to fit into one of notches $i$, formed on the hoe or cultivator-tooth H.

When the parts mentioned are arranged as just described, the draft of the hoe or cultivator-tooth H presses the projection $e$ down against the projection $b$, causing the projection $b$ to press upwardly against the end of the spring A resting on it. Simultaneously with this action the brace I pushes the locking-stud D over in the direction indicated by dotted lines in Fig. 1, causing the projection $d$, formed on the locking-stud, to press downwardly on the end of the spring A, against which it rests. In this manner the coiled spring A is acted upon simultaneously from both ends, thereby deriving full benefit from the spring. The same effect will be produced by coiling the spring A round a cylinder, J, formed on the socket-stud F, when made as shown in Fig. 4, and placing the projection $d$ on the socket-stud F, instead of on the locking-stud D. The projection $e$ will also be reversed, being placed on the cylinder B instead of on the socket-stud. The disk E will also have to be reversed, being journaled on the cylinder J instead of on the cylinder B. This slight change in the parts mentioned will produce exactly the same effect as though the spring A were placed on the cylinder B, as shown in Fig. 1.

From this description it will be seen that the tension of the spring A holds the hoe or cultivator-tooth H rigidly in position in its socket-stud F, and that it cannot be removed therefrom until the strain from the tension of the spring A is removed from it.

In order to restrain the tension of the spring A and thus enable the removal of the hoe or cultivator-tooth H, I provide a tool, K, one end of which has a hole, $j$, to fit over the pin $k$, formed on the socket-stud F. The other end of the tool K is provided with flanges $m$ to lap over the drag-bar C, so that when the stud D is pressed down between the bars forming the drag-bar the flanges $m$ shall extend over and grasp the stud D, the size of the tool K being made exact, so that when the stud D is pressed down between the plates forming the drag-bar and the flanges $m$ fit over it the pin $k$ will come immediately in front of the holes $i$, made in the tool K, which is fitted over it, thereby holding in complete subjection the tension of the spring A, and permitting the ready unhooking of the hoe or cultivator-tooth H both from the stud F and the brace I.

So far as the working of the spring A for bringing the hoe or cultivator-tooth back into its initial position after passing an obstruction is concerned, the socket-stud F might form part of or be permanently attached to the hoe or cultivator-tooth H, so that while we believe the best effects will be produced when the device is constructed as we have described, we do not wish to limit ourselves to the exact arrangement so far as the application of the single coiled-wire spring is concerned.

We do not claim, broadly, a spring coiled round a cylinder, journaled in the drag-bar for the purpose set forth, as we are aware that such construction is not new with us.

What we claim as our invention is—

1. A coiled-wire spring wound round a cylinder journaled in the drag-bar, and having one of its ends arranged to direct pressure directly against the locking-stud, while the other end directs pressure against a projection formed upon or attached to the hoe or cultivator-tooth, so that the draft of the latter shall be directed simultaneously against both ends of the spring.

2. The coiled-wire spring A, wound round the cylinder B and having one of its ends attached to a projection, $d$, in combination with the socket-stud F and a disk, E, journaled in the cylinder B and provided with a projection, $a$, to connect with the end of the spring A, and a projection, $b$, to connect with the projection $e$ on the socket-stud F, substantially as and for the purpose specified.

3. The socket-stud F and a spring, A, coiled round a cylinder, J, attached to the socket-stud F, which is journaled in the drag-bar C, as specified, a projection, $d$, formed upon or attached to the stud F, in combination with the disk E, journaled on the cylinder J, and provided with projections $a$ and $b$ for connecting it to the spring A, and locking-stud D, substantially as and for the purpose specified.

4. The socket-stud F, journaled on the end of the drag-bar, and having a socket formed in it to receive the hoe or cultivator-teeth H, having a hook, G, formed on it to fit round the said stud, as specified, in combination with the coiled-wire spring A, one end of which is connected to the socket-stud F, while its other end is connected to the locking-stud D, which latter is connected by the brace I to the hoe or cultivator-tooth.

Ingersoll, October 31, 1885.

JAMES NOXON.
THOMAS HENRY NOXON.

In presence of—
JNO. W. SHAVER,
JNO. P. WEBSTER.